United States Patent [19]

Brown

[11] 3,957,164

[45] May 18, 1976

[54] WHEELCHAIR HOIST AND CARRIER

[76] Inventor: Joseph H. Brown, 1020 Riverside Drive, Holly Hill, Fla. 32017

[22] Filed: Oct. 16, 1974

[21] Appl. No.: 515,411

[52] U.S. Cl. .................................. 214/75 H; 212/17

[51] Int. Cl.$^2$ .............................................. B60P 1/54

[58] Field of Search .................. 214/75 R, 75 H, 85, 214/95 R, 357; 212/17, 18, 19; 37/124; 187/9

[56] References Cited

UNITED STATES PATENTS

| | | | |
|---|---|---|---|
| 1,614,769 | 1/1927 | Amsler | 214/75 H |
| 2,543,379 | 2/1951 | Richardson | 212/17 |
| 2,793,768 | 5/1957 | Schaedler | 214/75 H |
| 3,074,562 | 1/1963 | Clayborne et al. | 212/63 |
| 3,232,455 | 2/1966 | Fountain et al. | 214/16.4 A |
| 3,355,040 | 11/1967 | Guttridge | 214/75 H |
| 3,463,334 | 8/1969 | Blakely et al. | 214/75 H |
| 3,656,637 | 4/1972 | Lynn et al | 214/75 H |

*Primary Examiner*—Robert J. Spar
*Assistant Examiner*—Lawrence J. Oresky
*Attorney, Agent, or Firm*—John N. Randolph

[57] ABSTRACT

An apparatus for quick attachment to and detachment from a wheelchair and which is capable of raising, lowering and conveying the wheelchair and an occupant thereof, whereby such a person may be conveyed into or out of an enclosure without leaving the wheelchair. The apparatus includes a manually actuated switch which may be held and operated by the wheelchair occupant to control the up-and-down and linear movement of the wheelchair while attached to and supported by the apparatus.

5 Claims, 9 Drawing Figures

FIG.1
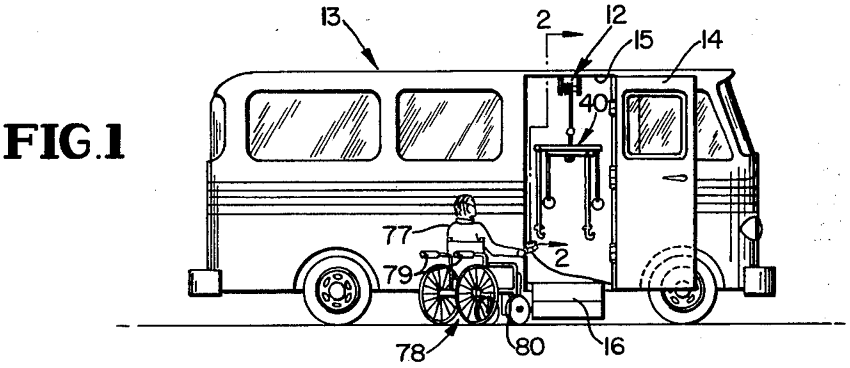
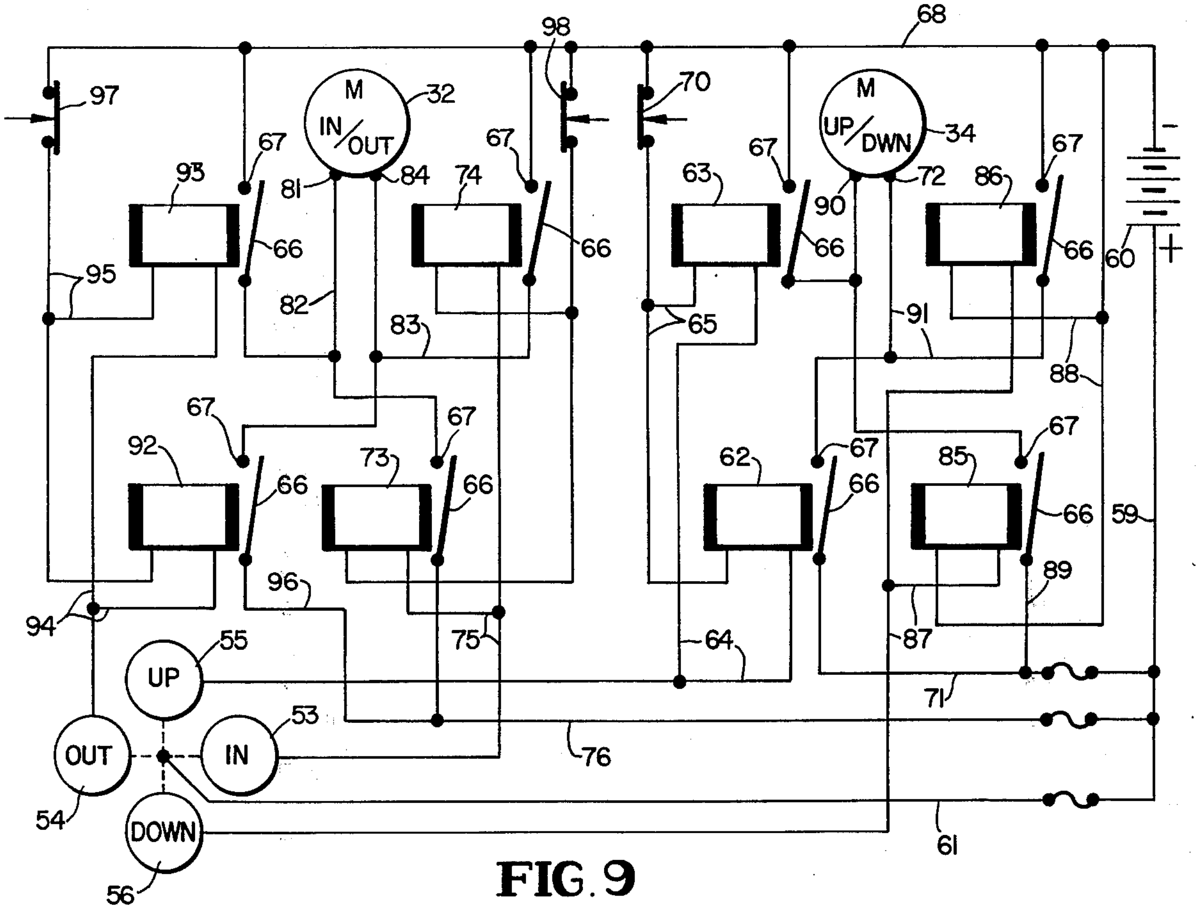
FIG.9
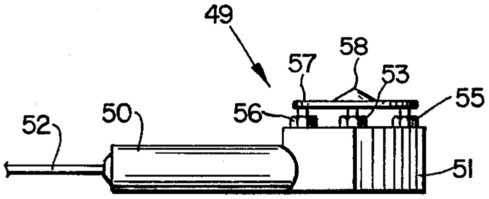
FIG.7
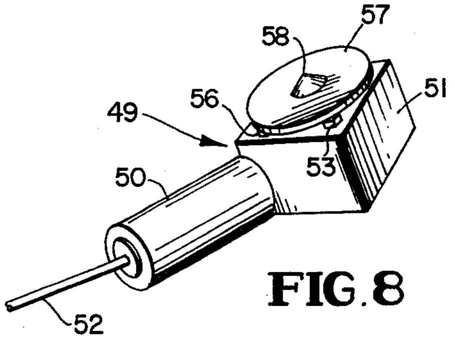
FIG.8

WHEELCHAIR HOIST AND CARRIER

SUMMARY

It is a primary object of the present invention to provide an apparatus of relatively simple construction which may be supported by an enclosure and attached to a wheelchair containing an occupant for raising, lowering and conveying the wheelchair and its occupant, for moving the wheelchair and occupant into or out of the enclosure.

Another object of the invention is to provide such an apparatus that may be supported solely by an overhead portion of the enclosure, so as not to interfere with otherwise normal use of the enclosure, or require modification of the structure in which it is mounted.

Still a further object of the invention is to provide an apparatus which may be utilized by a person confined to a wheelchair, without the assistance of others, for moving into and out of an enclosure.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a side elevational view of a motor home and showing the wheelchair hoist and carrier mounted therein;

FIG. 7 is a side elevational view of the control unit of the apparatus;

FIG. 8 is a perspective view thereof, and

FIG. 9 is a diagramatic view illustrating the electric circuits of the apparatus.

DESCRIPTION OF THE PREFERRED EMBODIMENT

Figures 2, 3, 4, 5, 6:
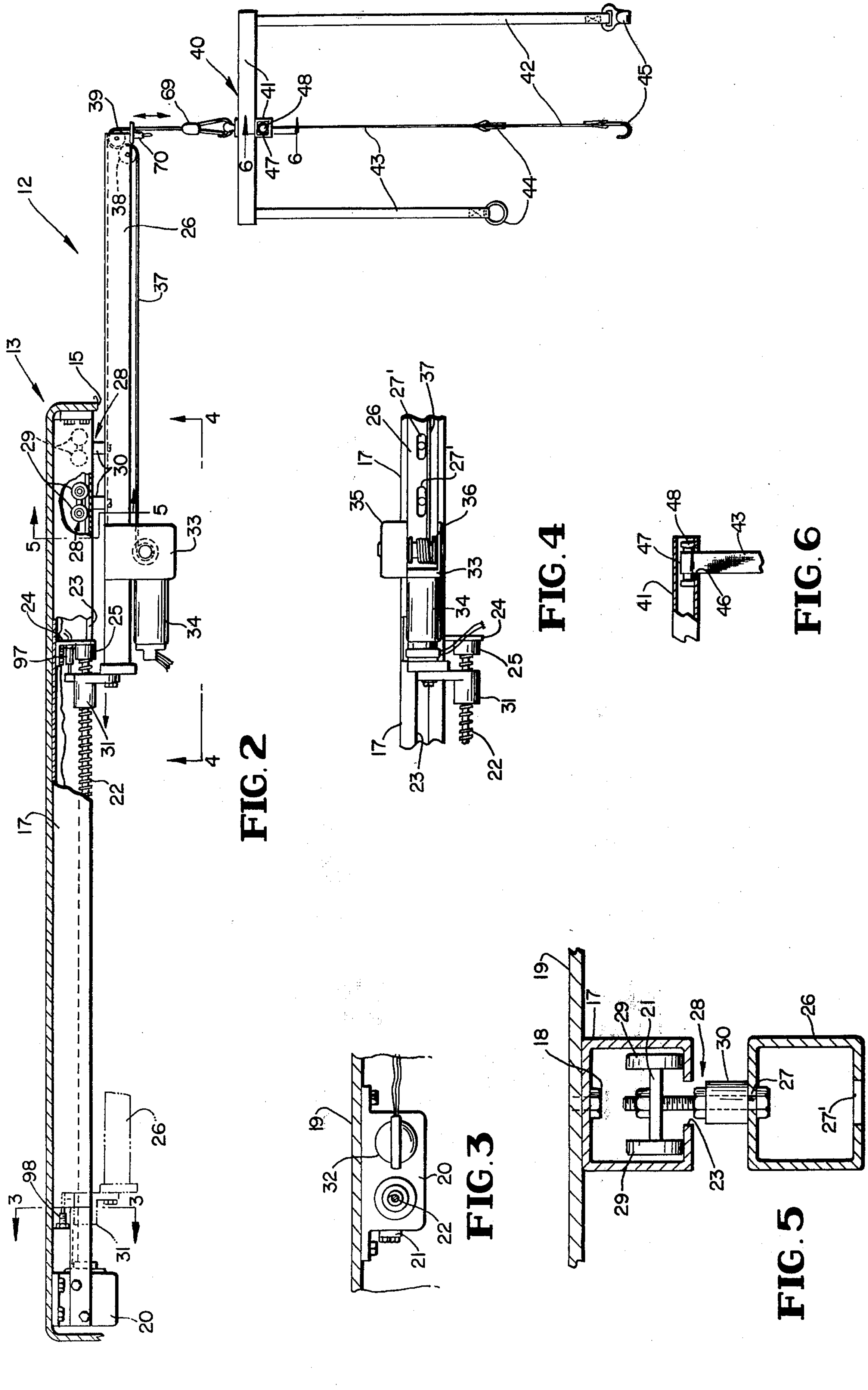
FIG. 2 is an enlarged side elevational view, partly broken away, taken substantially along a line 2—2 of FIG. 1.
FIG. 3 is a cross sectional view taken substantially along a plane as indicated by the line 3—3 of FIG. 2.
FIG. 4 is a fragmentary bottom plan view, taken substantially along a plane as indicated by the line 4—4 of FIG. 2.
FIG. 5 is an enlarged fragmentary cross sectional view, taken substantially along a plane as indicated by the line 5—5 of FIG. 2.
FIG. 6 is a fragmentary sectional view, on an enlarged scale, taken substantially along a plane as indicated by the line 6—6 of FIG. 2.

Referring more specifically to the drawings, the wheelchair hoist and conveyor in its entirety and comprising the invention is designated generally 12 and is best illustrated in FIG. 2. For the purpose of illustrating a preferred application and use of the apparatus 12, a conventional motor home 13 is shown in FIG. 1 having a door 14, shown in an open position, but which normally closes an access opening 15 in one side of the vehicle 13. One or more steps 16 are provided below the opening 15 to be utilized by the occupants in entering or leaving the enclosure, provided by the interior of the vehicle 13. It will be understood, as the description proceeds, that the apparatus 12 is equally well adapted to be used with other types of enclosures, such as, home trailers, mobile homes, conventional dwellings, boats and various other enclosures, access to which is had by the use of steps.

Referring to FIG. 2, the apparatus 12 includes an enlongated rail 17 of box-like construction in cross section, as seen in FIG. 5. Fastenings 18 extend through a top portion of the rail 17 to secure it to the underside of the roof 19 of the vehicle 13, crosswise thereof and substantially in alignment with the vertical center of the doorway or opening 15. A gearbox 20 is secured to the underside of the roof 19 adjacent the side of the vehicle 13 located remote from the doorway 15 and adjacent one end of the rail 17.

One end of a worm 22 is journaled in the gearbox 20. Said worm extends along a front side of the rail 17 and has its opposite end supported and journaled in a bearing 25 which is supported by a bracket 24 which is secured to said front side of rail 17.

A boom 26, which is box-shaped in cross section, has spaced openings 27 in its top wall. Two or more trolleys 28 support the boom 26 beneath the rail 17. Each trolley 28 includes a pair of wheels 29 which ride on the rail 17 on opposite sides of its slot 23, as seen in FIG. 5, and a hanger 30 which includes a headed bolt which extends up through an opening 27 of boom 26 and which is supported by the frame 21 of the trolley 28. Openings 27′ in the bottom wall of boom 26 align with openings 27 to receive a bolt engaging tool.

A nut 31 threadedly engages the worm 22 and is secured to an inner end of the boom 26. A reversible electric motor 32 is supported by the gearbox 20 and is connected by reduction gearing, not shown, contained in said gearbox 20, to the worm 22, so that when the motor 32 is energized for driving the worm 22 in one direction, the nut will move from its forwardmost position, as seen in full lines of FIG. 2, to its rearmost position, as seen in dotted lines of FIG. 2, for causing the boom 26 to travel therewith from its forwardmost full line position to its rearmost dotted line position.

A bracket 33 is supported by and depends from the boom 26, near its rear end, and provides a support for a second reversible motor 34 and a gearbox 35, and additionally provides a support and journal for a winch 36, which is connected to the motor 34 by reduction gearing, not shown, contained in the gearbox 35. A non-elastic flexible member, such as a rope or cable 37, is wound on the winch 36 and extends therefrom along the underside of the boom 26 toward its outer end where it passes under a sheave 38 and over a sheave 39. The sheaves 38 and 39 are journaled in an outer end of the boom 26. The free end of the cable 37 extends downwardly from the sheave 39 and is attached to a sling 40 which includes cross arms 41. Long non-elastic tapes or straps 42 depend from one end of each cross arm, and shorter non-elastic straps 43 depend from the other two cross arm ends and terminate in rings 44. Hooks 45 are secured to the lower ends of tapes 42. The cross arms 41 are preferably square in cross section and each has a slot 46 in its bottom wall and adjacent each end thereof, through which its strap 42 or 43 extends. Each strap 42 or 43 terminates in a loop 47 at its upper end through which extends a spool 48, FIG. 6, for detachably connecting the strap to the cross arm.

FIGS. 7 and 8 illustrate a control unit 49 including a handle 50 and a head 51. An electric cable 52 extends into the head 51 through the handle 50. Four pushbutton switches 53, 54, 55 and 56 are mounted in the head 51 and protrude from an upper face thereof which is substantially square. One of the pushbutton switches is located adjacent each of the four corners of said head 51. Three of the pushbutton switches are visible in FIG.

7 and all four switches are indicated in FIG. 9. A circular plate 57 is supported by a resilient mounting element 58 on the head 51 and above the four switches 53–56, for rocking movement relative to said head in any direction.

Referring to FIG. 9, a positive conductor 59 leads from an electrical current source 60, such as a 12 volt battery, and has a branch conductor 61 connected to one contact of each switch 53–56. Assuming that the parts are in their full line positions of FIG. 2, but with the sling lowered relative to its position of FIG. 2, the occupant of a wheelchair 78, FIG. 1, would move the wheelchair to a position beneath the sling 40 and engage the two rings 44 over the handles 79 and the hooks 45 with the sides of the seat frame 80. The wheelchair occupant would then pick up the control unit 49 lying on the floor of the motor home 13, adjacent the open door 14, and would press on the plate 57 to close the switch 55. This will energize the relays 62 and 63 through the conductors 64 and 65 for causing the blades 66 of said relays to engage the contacts 67 thereof for completing an electric circuit through the reversible motor 34 and a negative conductor 68 of the current source 60, for driving the motor 34 in a direction for winding the cable 37 onto the winch 36 until the element 69, FIG. 2, attached to the cable 37, engages and opens the limit switch 70 for interrupting the circuit and the operation of the motor 34. The current flow to the motor 34 is through a branch conductor 71 to the post 72 of the motor 34.

To thereafter move the wheelchair 78 and its occupant 77 into the enclosure 13, the occupant presses on the plate 57 to close the switch 53 for energizing the relays 73 and 74 through the conductors 75 and 76 for causing the switch blades 66 of said relays to engage the relay contacts 67. Current will then flow from the current source 60 and its positive conductor 59 through the branch conductor 76 to the contact 81 of the motor 32, by way of the conductor 82, and back to the negative conductor 68 through the conductor 83 from the other contact 84 of the motor 32, for causing the motor 32 to revolve the worm 22 in a direction for moving the boom 26 from its full line to its dotted line position of FIG. 2. At this time the nut 31 engages and opens a limit switch 98, as seen in dotted lines in FIG. 2, to interrupt this circuit to motor 32.

The chair occupant 77 would then rock the plate 57 in a direction for closing the switch 56 for completing a circuit through the relays 85 and 86 by way of the conductors 87 and 88, back to the negative conductor 68. Current will then flow from the branch conductor 71 through the conductor 89, which includes blade 66 and contact 67 of the relay 85, to the other terminal 90 of the motor 34, and back from the terminal 72 of said motor 34 to the negative conductor 68 by way of the conductor 91 and the blade 66 and contact 67 of the relay 86 to drive motor 34 in the opposite direction to lower the wheelchair. No limit switch is provided in this circuit since when the wheelchair 78 comes to rest on the floor of the coach 13, or on the ground outside of the coach, the operator can then release manual pressure on the plate 57.

To leave the coach 13, the occupant 77 attaches the sling 40 to the wheelchair 78, as previously described, and elevates the wheelchair 78 by closing the switch 55, as previously described, until this circuit is interrupted by opening of the limit switch 70. The occupant then rocks the plate 57 in a direction for closing the switch 54 so that current will flow therethrough from the current source 60 to the relays 92 and 93 by way of the conductors 94, and back to the current source 60 by the conductors 95 and 68. This will cause a current flow into the motor 32 from the branch conductor 76 by way of the conductor 96 which includes blade 66 of relay 92 and the contact 67, which said blade engages. The blade 66 of the relay 93 which engages the contact 67 thereof will complete the circuit for driving the motor 32 in the opposite direction to that previously described, for moving the boom 26 from its dotted line to its full line position of FIG. 2, at which time the nut 31 will strike the limit switch 97 for deenergizing the relays 92 and 93 and the motor 32. Conductors 61, 71 and 76 each contain a fuse 99.

The switch 56 can then be closed, as previously described, for causing the cable 37 to be payed out from the winch 36 for lowering the sling 40 and wheelchair 78 to deposit said wheelchair on the roadway or ground outside of the coach 13.

The straps 42 and 43 are of such relative lengths as to cause the wheelchair frame to be sloped downwardly from front to rear so that the occupant 77 will tend to lean against the backrest of the wheelchair, and so that the rear wheelchair wheels will come to rest on a supporting surface prior to the front wheels.

The cable 52, which contains conductors 61, 64, 75, 87 and 94, has sufficient slack so that the occupant 77 of a wheelchair 67 can manually propel himself to a position adjacent the doorway 15 where he can unlatch and open the door 14, if closed, and reach into the vehicle 13 to pick up the control unit 49, which is left adjacent the doorway 15 when the person 77 is outside of the enclosure 13. The unit 49 can then be operated to extend the boom 26, if retracted, and lower the sling 40.

Various modifications and changes are contemplated and may be resorted to without departing from the function or scope of the invention.

I claim as my invention:

1. A wheelchair hoist and carrier comprising a rail, means mounting said rail on the underside of a vehicle roof entirely within the vehicle and in alignment with a door of the vehicle, one end of the rail being disposed adjacent said door, a boom, trolley means supported by the rail and movably supporting the boom for reciprocating movement beneath the rail between a retracted position entirely beneath the rail and a projected position with an outer end of the boom disposed outwardly of said rail end and said door, a first electrically driven means for propelling said boom in either direction along the rail, a winch, a cable wound on said winch and having an end depending from said outer end of the boom, a sling suspended from said cable end and adapted to be detachably connected to a wheelchair, and a second electrically driven means for revolving said winch in either direction whereby said sling and a load supported thereby can be raised or lowered by said second electrically driven means and conveyed translationally in either direction by said first electrically driven means, said control unit including a handle and a head, a plurality of normally open pushbutton switches interposed in the circuits of said first and second electrically driven means, said switches being supported by the head and protruding from a top surface thereof, and a plate supported for rocking movement by said head and disposed above said switches, for selectively closing the switches when the plate is rocked in a direction for depressing a part thereof located above a selected switch.

2. A wheelchair hoist and carrier as in claim 1, limit switches interposed in the electric circuits of said first electrically driven means and disposed in the path of travel of a part connected to the boom for deenergizing said first electrically driven means as said boom reaches extremities of its travel relative to the rail.

3. A wheelchair hoist and carrier as in claim 1, said first electrically driven means comprising an electric motor secured to the rail, a worm driven by said motor, and a nut threadedly engaging said worm and secured to the boom.

4. A wheelchair hoist and carrier as in claim 1, and means resiliently mounting said plate for normally returning the plate to a position substantially parallel to said top surface of the head and in a location such that each of the switches is in an open position.

5. A wheelchair hoist and carrier comprising a rail, means mounting said rail on the underside of a vehicle roof entirely within the vehicle and in alignment with a door of the vehicle, one end of the rail being disposed adjacent said door, a boom, trolley means supported by the rail and movably supporting the boom for reciprocating movement beneath the rail between a retracted position entirely beneath the rail and a projected position with an outer end of the boom disposed outwardly of said rail end and said door, a first electrically driven means for propelling said boom in either direction along the rail, a winch, a cable wound on said winch and having an end depending from said outer end of the boom, a sling suspended from said cable end and adapted to be detachably connected to a wheelchair, and a second electrically driven means for revolving said winch in either direction whereby said sling and a load supported thereby can be raised or lowered by said second electrically driven means and conveyed translationally in either direction by said first electrically driven means, said sling including cross arms, straps depending from the ends of said cross arms and including a pair of short straps and a pair of long straps, rings connected to the lower ends of the short straps and adapted to detachably engage the wheelchair handles, and hooks connected to the depending ends of the long straps and adapted to detachably engage the sides of the seat frame of the wheelchair.

* * * * *